UNITED STATES PATENT OFFICE.

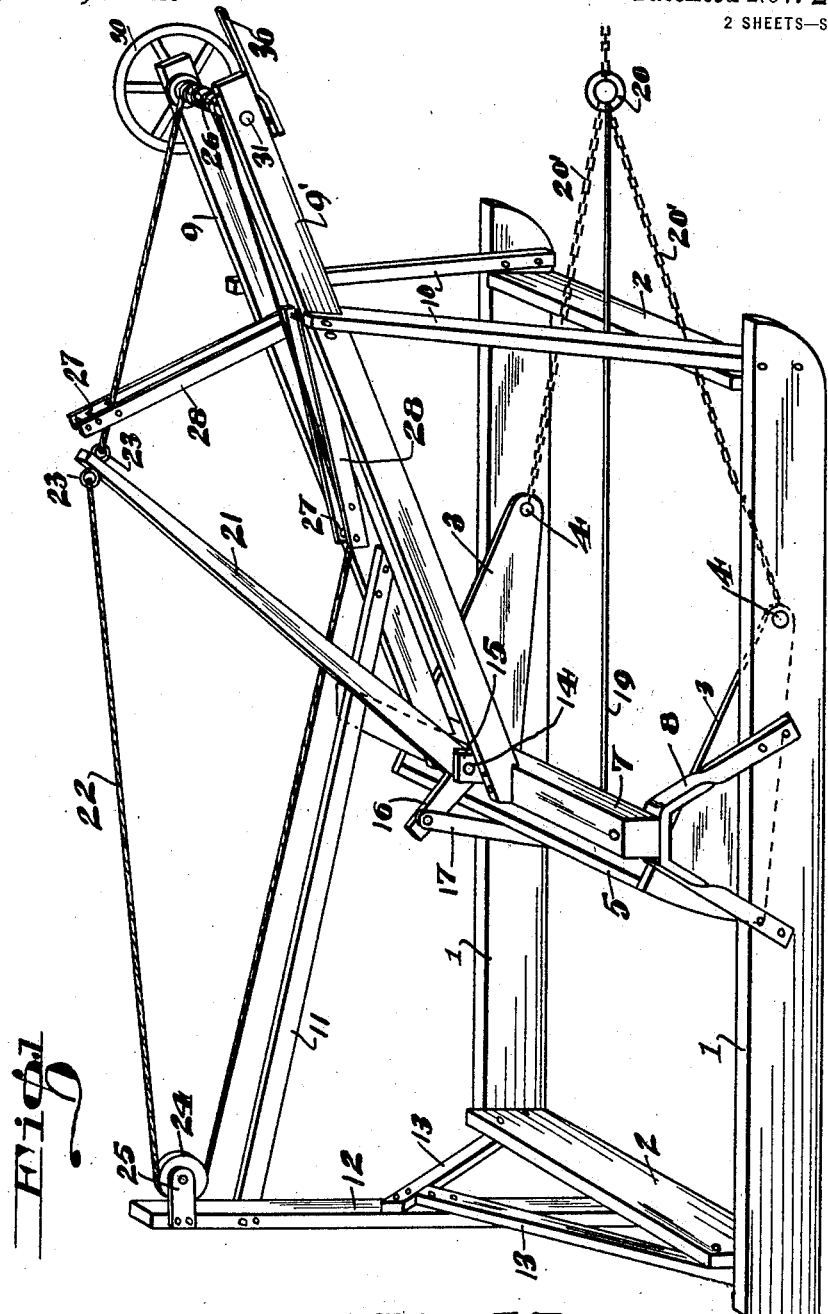

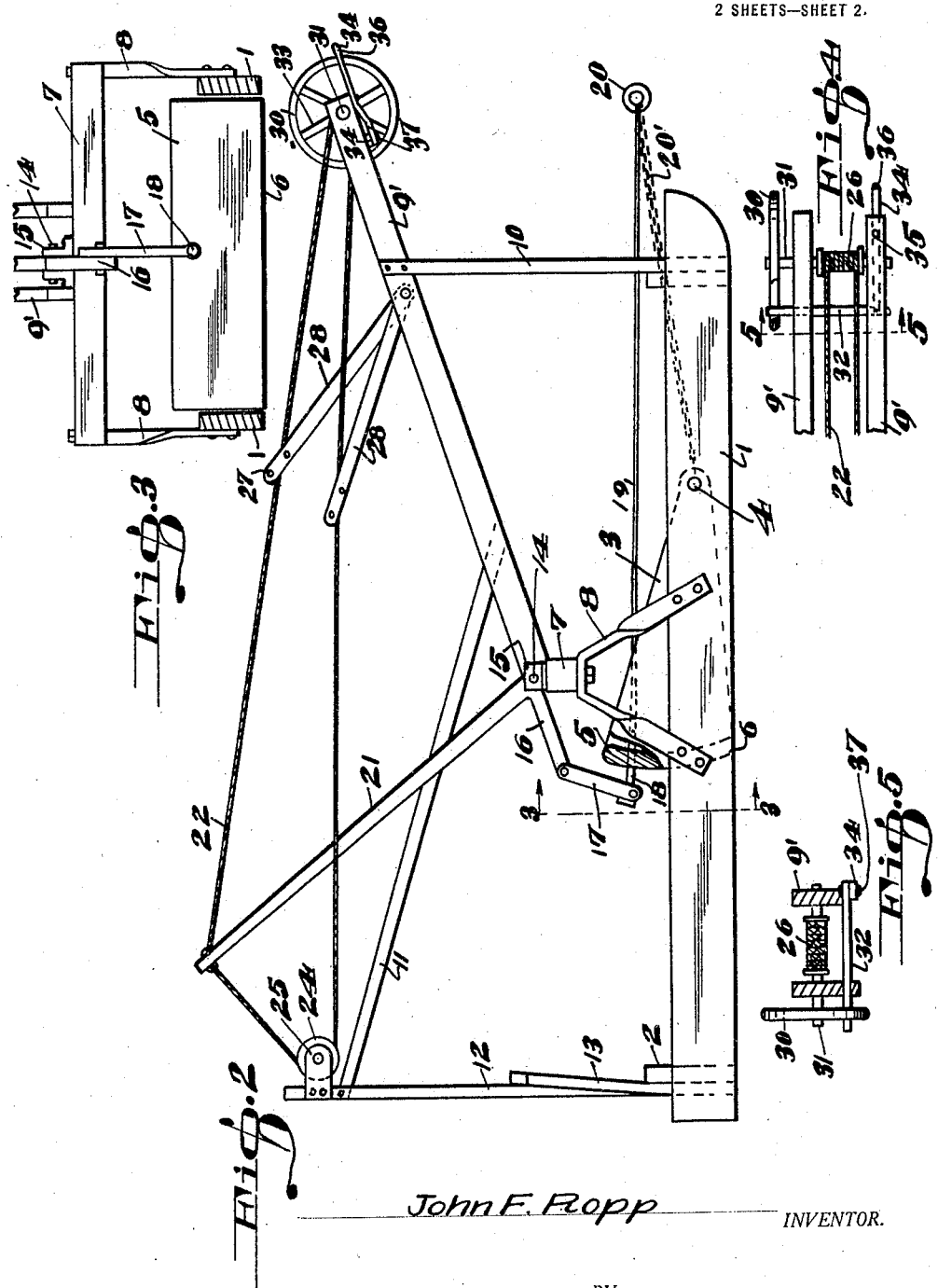

JOHN F. ROPP, OF BLYTHE, CALIFORNIA.

LEVELER.

1,397,784.   Specification of Letters Patent.   Patented Nov. 22, 1921.

Application filed May 11, 1920. Serial No. 380,563.

*To all whom it may concern:*

Be it known that I, JOHN F. ROPP, a citizen of the United States, residing at Blythe, in the county of Riverside and State of California, have invented new and useful Improvements in Levelers, of which the following is a specification.

This invention is a leveler and has for its object the provision of a scraping leveler arranged to be drawn by a tractor or the like, and provided with operating means for dumping the scraper, conveniently positioned with relation to an operator upon the tractor.

The invention will be readily understood from the following description of the accompanying drawings, in which—

Figure 1 is a perspective view of the leveler with the scraper in raised dumping position.

Fig. 2 is a side elevation of the same with the scraper in lowered scraping position.

Fig. 3 is a transverse section on the line 3—3 of Fig. 2.

Fig. 4 is a top plan view of the clutch mechanism for actuating the scraper.

Fig. 5 is a transverse section on the line 5—5 of Fig. 4.

The improved leveler is shown as comprising a drag frame comprising side bars 1 and end bars 2. The scraper mounted in this frame comprises side walls 3 pivoted at their forward ends to the side bars 1, preferably, against the inner surfaces of said side bars as by pivot pins 4. A scraper bar 5 extends across the drag frame and is secured at its opposite ends to the side walls 3. When the side walls 3 are swung downwardly the scraper bar 5 is in scraping position and is arranged to engage the surface to be leveled at its lower edge 6. The scraper bar is, preferably, an upright bar slightly curved transversely, as clearly shown in Fig. 2.

The actuating mechanism for swinging the scraper upon its pivots 4 from its normal ground engaging position may comprise the following mechanism:

A cross bar 7 is supported above the drag frame by brackets 8 and a derrick 9 comprising spaced side bars 9' extends forwardly from the cross bar 7 and is, preferably, supported by supports 10 extending upwardly from the front cross bar 2 of the drag frame. A brace 11 extends from this derrick rearwardly to a support 12 extending upwardly from the rear cross bar 2 and suitably braced as shown at 13. The forward end of the derrick is so positioned as to be convenient to the operator standing upon the rear of the tractor arranged to pull the leveler.

A bell crank lever is pivoted at 14 in brackets 15 upon the cross bar 7 between the side frames 9 of the derrick. One of the arms of this bell crank lever is shown as a relatively short arm 16 to which is pivoted a link 17 extending downwardly in rear of the scraper bar 5. A bolt 18 extends through the lower end of this link and through the scraper bar and is connected at its end to a draft rod 19 extending forwardly beyond the drag frame and terminating in an eye 20. Draft chains 20', preferably, connect the eye 20 with the respective side bars of the drag frame, preferably, at the pivots 4. Any suitable tractor or other pulling means is arranged to be connected to the eye 20 in any suitable manner for dragging the leveler over the ground. The other arm of the bell crank lever is, preferably, a relatively long arm 21 extending upwardly and arranged to be swung lengthwise of the drag frame for raising and lowering link 17 and the scraper connected thereto.

For this purpose a flexible connection, shown as a cable 22, is secured at its ends to eye bolts 23 upon the end of lever arm 21. This cable extends from the lever arm rearwardly over a pulley 24 suitably journaled in brackets 25 upon the rear support 12 and then forwardly and around a pulley 26 mounted at the front end of the derrick 9. The cable extends around pulley 26 for several turns and then extends rearwardly to the lever arm 21. The cable 22 may be guided between pulley 26 and lever arm 21 and between pulley 24 and pulley 26 between suitable guide pins 27 secured in bracket frames 28 mounted upon the derrick 9.

By the construction as thus described it will be seen that if pulley 26 is rotated in opposite directions the cable will be moved in opposite directions to swing lever arm 21 forward and back so as to raise or lower the scraper bar into inoperative dumping position or into operative ground engaging leveling position. The means for thus rotating pulley 26 and thus controlling the scraper are arranged adjacent the pulley at the forward end of the derrick 9 so that when a tractor is employed for dragging the leveler the operator of the tractor may conveniently control the actuating mechanism for the pulley.

The actuating mechanism may comprise a handwheel 30 fixed upon the shaft 31 upon which pulley 26 is also fixed this shaft extending through bearings in the side frames of derrick 9, and the handwheel is, preferably, arranged thereon beyond the derrick. The handwheel is adapted to be rotated in reverse directions for controlling the scraper of the leveler and means are, preferably, provided for locking the handwheel with the scraper in any desired position.

For this purpose a rod 32 extends across the derrick through suitable guide bearings and is arranged to either project between spokes 33 of the handwheel for locking the handwheel against rotation, or to be retracted from said wheel engaging position so as to permit ready rotation of the handwheel.

An actuating lever 34 is pivoted at 35 to one of the side frames of the derrick 9 and is provided with a handle 36 at one end and a pivotal connection 37 at its opposite end with the end of locking rod 32. The locking lever 32 is thus arranged to be moved to or from locking position by manually moving the lever 34.

Various changes may be made without departing from the spirit of the invention as claimed.

What is claimed is:

1. A leveler comprising a frame, a scraper pivoted on said frame, a cross support, a derrick projecting forwardly from and supported upon said support, a bell crank mounted on said support, a link connecting one arm of said crank with said scraper, a pulley support positioned on the rear of said frame, pulleys mounted on the latter support and on the forward end of said derrick, a flexible member passed around said pulleys and fastened to the other arm of said crank, and means for actuating one of said pulleys so as to raise or lower said scraper.

2. A leveler comprising a frame, a scraper pivoted on said frame, a bell crank suitably supported by said frame, a link connecting one arm of said crank and said scraper, pulleys spaced on each side of the other arm of said crank, and a flexible member passing around said pulleys and connected to the latter arm so that said scraper will be raised or lowered according to the respective direction that said member is pulled.

3. A leveler comprising a frame, a scraper pivoted on said frame, a bell crank suitably supported by said frame, a link connecting one arm of said crank and said scraper, and means for actuating the other arm of said crank in either direction, said means comprising tension members connected to the latter arm.

4. A leveler comprising a frame, a scraper having an upright scraper bar pivoted on said frame, a lever, a link pivoted to said lever, a connecting bolt extending through said link and said upright scraper bar, and a draft connection extending forwardly from said bolt.

In testimony whereof I have signed my name to this specification.

JOHN F. ROPP.